United States Patent [19]

Pines et al.

[11] 4,345,148

[45] Aug. 17, 1982

[54] AUTOMATIC RESPONSIVITY CONTROL FOR A CCD IMAGER

[75] Inventors: Michael Y. Pines, Los Angeles; Colin G. Whitney, Woodland Hills; James S. Duncan, Los Angeles, all of Calif.

[73] Assignee: Hughes Aircraft Company, Culver City, Calif.

[21] Appl. No.: 194,204

[22] Filed: Oct. 6, 1980

[51] Int. Cl.³ ............................................. H01J 40/14
[52] U.S. Cl. ................................. 250/214 C; 250/578
[58] Field of Search ................ 250/211 R, 211 J, 578, 250/214 R, 214 C; 357/24 LR, 29, 30, 31; 307/311, 221 D; 358/212, 213

[56] References Cited

U.S. PATENT DOCUMENTS

| | | | |
|---|---|---|---|
| 3,904,818 | 9/1975 | Kovac | 250/211 J |
| 4,145,721 | 3/1979 | Beaudouin et al. | 307/221 D |
| 4,246,480 | 1/1981 | Clark | 250/578 |
| 4,300,210 | 11/1981 | Chakravati et al. | 357/24 LR |

*Primary Examiner*—David C. Nelms
*Attorney, Agent, or Firm*—Robert M. Wallace; W. H. MacAllister

[57] ABSTRACT

An automatic responsivity control (ARC) circuit compensates for the nonuniform deviation $\Delta R$ in the average responsivity R of a column of photodetectors from a nominal responsivity $R_0$ which is uniform from column to column. The ARC circuit first establishes a reference level by subtracting two known calibration signals occurring during optical retracing and then multiplies the reference level by each image signal occurring during optical scanning. The resulting product contains undesirable signal components or terms which are algebraic functions of $\Delta R^2$ and other terms which are algebraic functions of $\Delta R$. The terms in $\Delta R^2$ are ignored because $\Delta R$ is significantly less than $R_0$. The terms in $\Delta R$ are eliminated by establishing a second reference level, which itself includes terms in $\Delta R$, and then subtracting the foregoing product from the second reference level. If the bias voltages applied to the ARC circuit are adjusted according to a formula discussed in the detailed description, this second subtraction results in a cancellation of all terms in $\Delta R$. The resulting output signal therefore contains only terms in $\Delta R^2$ which are negligible, and thus the output signal is substantially free of distortion due to responsivity deviations.

14 Claims, 16 Drawing Figures

AUTOMATIC RESPONSIVITY CONTROL FOR A CCD IMAGER

TECHNICAL FIELD

This invention is related to charge coupled image sensors in which automatic responsivity control is required to compensate for variations in photodetector responsivity.

BACKGROUND OF THE INVENTION

Charge coupled device (CCD) image sensors are well-known in the art and are discussed in Sequin et al, *Charge Transfer Devices*, Academic Press, New York (1975), pages 142–200. Such charge coupled imagers include focal plane arrays of semiconductive photodetectors formed on the surface of a semiconductor substrate. The detectors are arranged in columns, each column of detectors adjacent and parallel its own CCD column register, into which each of the detectors in the column feeds charge. The focal plane array includes a plurality of parallel columns of photodetectors and a corresponding plurality of CCD column registers. The plurality of column registers transfers charge from the plurality of photodetectors into a multiplexing register disposed at the top of the photodetector columns and perpendicular thereto. An optical system focuses an image onto the focal plane array. Simultaneously, charge transfer occurs in the plurality of column registers and in the multiplexing register so that the charge packets dumped out of the multiplexing register correspond to real time serial data analogous to a television signal. The field of view may be increased and the signal-to-noise ratio improved by having the optical system scan an image across the focal plane array in a direction parallel to the columns of photodetectors and toward the multiplexing register in synchronism with the charge transfer in the readout column registers. It is well-known to those skilled in the art that this type of scanning results in time delay and integration of stationary images in each of the column readout registers.

A significant problem which limits performance of focal plane arrays is that the responsivities of individual photodetectors in the array are typically non-uniform. The term "responsivity" refers to the ratio of the amount of current generated in a semiconductor photodetector divided by the power of the beam of photons incident on the detector, which ratio is a constant characteristic of the physical properties of an individual detector. If the non-uniformity in responsivity is sufficient, the average responsivity of each of the columns of photodectors may differ widely from column to column, distorting the serial data dumped from the multiplexing register. Although it is possible to make substantial compensation for such distortion using conventional techniques, such conventional compensation requires additional hardware provided externally of the focal plane array substrate, including hardware to demultiplex the output signal dumped from the multiplexer register and to provide timing and memory functions. Such additional hardware consumes space and power, a significant disadvantage.

SUMMARY OF THE INVENTION

The problem of signal distortion due to non-uniform detector responsivity is solved by the present invention in which charge coupled automatic responsivity control is provided at the output of each column of photodetectors to compensate for nonuniformity in the average responsivities of the various columns of photodetectors. The automatic responsivity control is provided by a charge coupled circuit formed on the focal plane array substrate. One such circuit is provided at the output of each serial column register to provide the requisite correction for detector responsivity deviation before the data is dumped into the multiplexing register. The automatic responsivity control (ARC) circuit compensates for the non-uniform deviation $\Delta R$ in the average responsivity $R$ of a column of photodetectors from a nominal responsivity $R_O$ which is uniform from column to column. Operation of the ARC circuit substantially eliminates the effect of the responsivity deviation $\Delta R$ on the video output signal.

Charge packet output from each column of photodetectors comprises a serial train of image signal charge packets and calibration charge packets. On-chip processing is accomplished by splitting the output so that the image packets are transferred into one channel while the calibration packets are transferred in another channel, thus providing two separate signals which may be processed separately and combined to produce an improved result.

The ARC circuit first establishes a bias-free reference level by subtracting two calibration charge packets of different predetermined sizes which are generated during the retrace movement of the optical scanning device. Then, during the subsequent scanning movement of the optical device when image signal charge packets are generated, the ARC circuit multiplies the image signal charge packets by the reference level previously established. The resulting product contains the desired signal components (or "terms") which are algebraic functions of the uniform responsivity $R_O$ and $R_O^2$ and other undesirable terms which are algebraic functions of $\Delta R$ and $\Delta R^2$. The $\Delta R^2$ terms may be ignored because $\Delta R^2$ is typically a very small number in comparison with $R_O$. In order to eliminate the remaining $\Delta R$ terms, the ARC circuit establishes a second reference level which itself includes terms in $\Delta R$ and $\Delta R^2$ and then subtracts the foregoing product from the second reference level. It is a discovery of this invention that, if the reference levels are properly adjusted by a particular selection of the bias voltages applied to the ARC circuit in accordance with a formula discussed in the detailed description below, this second subtraction results in a cancellation of all terms in $\Delta R$. The resulting output signal thus contains substantially only the desired terms in $R_O$. As a result, the output signal is substantially free of distortions due to the responsivity deviation $\Delta R$, and thus the desired correction is achieved without having to use hardware external of the focal plane substrate.

BRIEF DESCRIPTION OF THE DRAWINGS

The invention is best understood by reference to the accompanying drawings of which:

FIG. 4a is a timing diagram illustrating the movement of the optical system illustrated in FIGS. 1 and 2;

FIG. 4b is a diagram of the time domain waveform of the photon beam power incident on the focal plane array column of FIG. 2 corresponding in time to the diagram of FIG. 4a;

FIG. 5 includes diagrams of various time domain waveforms occurring in the ARC circuit of FIG. 3b plotted on a time scale expanded from that of FIGS. 4a and 4b beginning at time $T_P$ of FIGS. 4a and 4b and ending at time $T_Q$ of FIGS. 4a and 4b, of which:

FIG. 5a is a diagram of the time domain waveform of the clock signal $\phi_{diff}$;

FIG. 5b is a diagram of the time domain waveform of the clock signal $\phi_1$;

FIG. 5c is a diagram of the time domain waveform of the clock signal $\phi_2$;

FIG. 5d is a diagram of the amount of charge transferred into the main channel of the ARC circuit of FIG. 3b as a function of time;

FIG. 5e is a diagram of the time domain waveform of the clock signal $\phi_{TR1}$;

FIG. 5f is a diagram of the time domain waveform of the clock signal $\phi_{S1}$;

FIG. 5g is a diagram of the time domain waveform of the clock signal $\phi_{S2}$;

FIG. 5h is a diagram of the time domain waveform of the clock signal $\phi_{TR2}$; and FIG. 5i is a diagram of the time domain waveform of the clock signal $\phi_{S3}$.

DETAILED DESCRIPTION OF THE INVENTION

I. Brief System Description

A. The System Without the Invention

Figure 1:
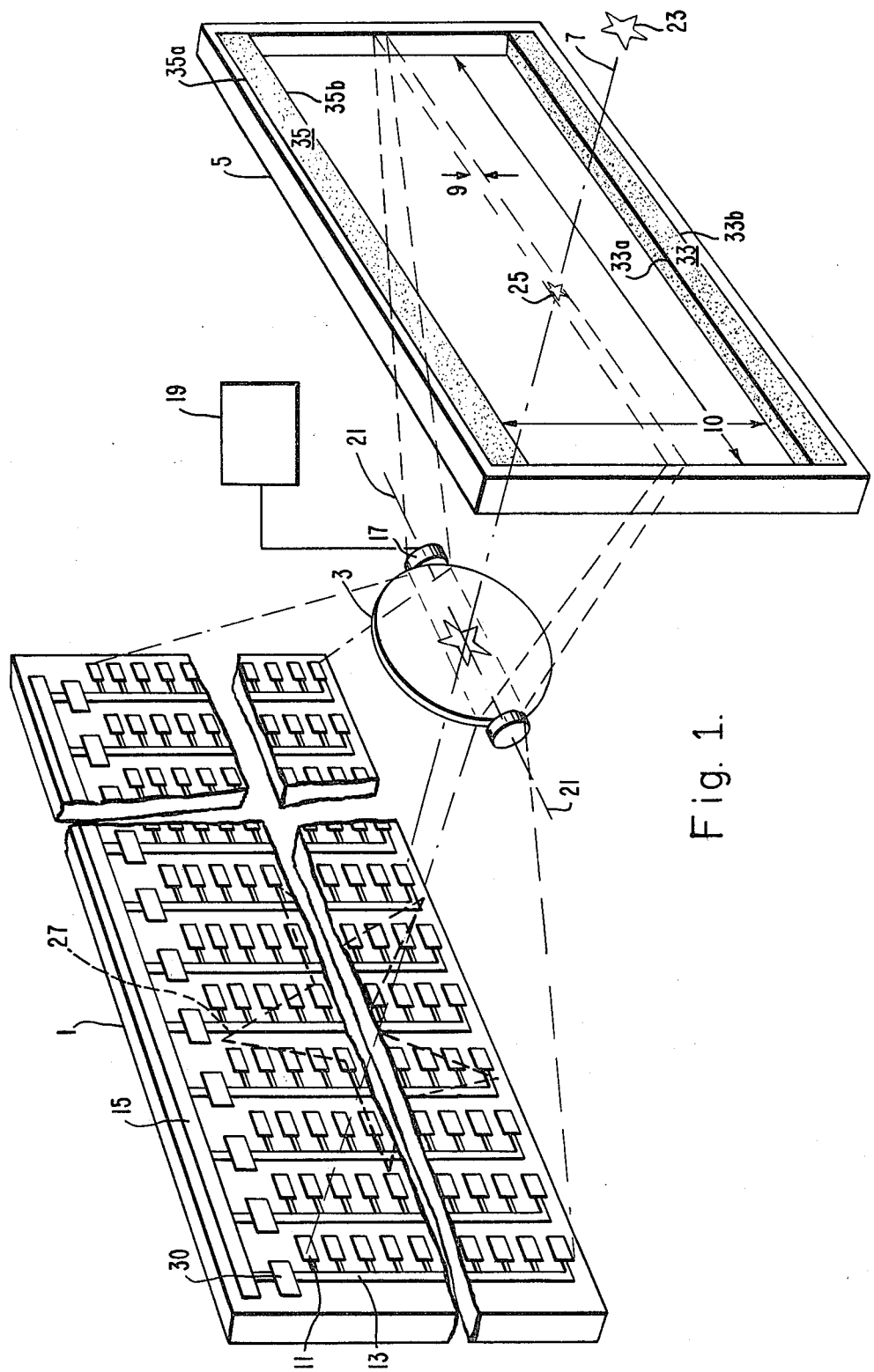
FIG. 1 is a simplified perspective view of a CCD scanning focal plane array imager incorporating the ARC circuit of the present invention.

A simplified charge coupled device imager system is illustrated in FIG. 1 including a semiconductor substrate 1, an optical device 3 and an aperture or field stop 5. The optical device 3 may include a complex system of mirrors, lenses and servo systems. However, in the simplified illustration of FIG. 1 the optical device 3 is depicted as a simple lens which focuses a light ray 7 passing through a narrow image element 9 in the field of view 10 defined by the field stop 5 onto approximately the entire surface of the substrate 1. A plurality of photodetectors 11 is arranged in a plurality of vertical columns on the surface of the substrate 1, and a plurality of charge couple device (CCD) readout column registers 13 are disposed adjacent and parallel the plurality of vertical columns of photodetectors 11. Light or infrared radiation focused by the optical device 3 onto the substrate surface causes the plurality of detectors 11 to generate and dump charge packets into the plurality of column registers 13. The charge packets are transferred upwardly in serial fashion in each CCD column register 13 into a horizontal multiplexing CCD register 15. The charge packets are transferred in serial fashion in the horizontal multiplexing register 15 to provide a serial output of charge packets representative of a multiplexed video signal analogous to a television signal. The elements 11, 13, 15, formed on the substrate 1 thus provide a focal plane array of the type discussed in Sequin et al, *Charge Transfer Devices*, Academic Press, New York (1975), on pages 142-200. In the preferred embodiment of this invention to be described below, the device is an infrared image sensing charge coupled device wherein the semiconductive substrate 1 is silicon and the plurality of photodetectors 11 comprise doping impurities in the substrate such as phosphorous, gallium or indium, as discussed in the Sequin publication. In this embodiment, the focused infrared radiation causes each photodector 11 to dump charge packets comprising holes into the column readout register 13.

The optical device 3 includes a servo system 17 controlled by processor 19 which causes the optical device 3 to scan the narrow image element 9 vertically downward to cover the entire field of view 10 in synchronism with charge transfer in the column registers 13, and then to retrace the image element 9 vertically upward. In the simplified schematic drawing of FIG. 1, the optical device 3 is depicted as a simple lens which the servo system 17 rotates under control of a processor 19 about a center line 21 in a clockwise direction in the perspective view of FIG. 1, so that an object 23 forming an image 25 within the image element 9 produces an image 27 on the surface of the substrate 1 which moves vertically upward synchronously with charge transfer in the plurality of column registers 13, in accordance with the scanning movement of the optical device 3. Such a scanning movement causes the image of a stationary object included in the image 9 to be repeated in vertically successive ones of the photodetectors 11 in each vertical column. Thus, as charge packets are transferred vertically upward in the column register 13, the image of stationary objects is time domain integrated as serial data loaded into the horizontal multiplexing register 15, significantly improving signal-to-noise ratio of the video signal which is read out of the horizontal multiplexing register 15. This type of signal processing is well-known in the art as CCD time delay and integration and was described by Erb and Nummedall, "Buried Channel Charge Couple Devices for Infrared Applications," CCD Applications Conference, *Proceedings* (18-20 September 1973), pages 157-167.

B. The Problem Solved by the Invention

A fundamental problem in CCD focal plane arrays is that the responsivities of the various detectors 11 are typically non-uniform, which creates spatial distortion of the video output signal. The current of charge generated by a particular photodetector 11 divided by the power of the beam of photons incident on that detector characterizes the responsivity of that detector, which typically varies among different detectors. Each vertical column of photodetectors 11 on the substrate 1 has an average responsivity characterized by the collective reponsivities of the individual photodetectors 11 included in that column. The average responsivity of a column of photodetectors 11 may differ significantly from the average reponsivity of other columns of photodetectors 11, which causes spatial distortion of the video signal dumped out of the multiplexing register 15. In the prior art, while the technology has existed to provide electronic correction for deviation in responsivities between vertical columns of photodetectors 11, such correction is typically provided externally of the monolithic focal plane array because of the complexity of the correcting hardware. Specifically, because the video data dumped out of the horizontal register 15 is multiplexed, such correcting hardware would have to include demultiplexing, timing and memory functions. A significant disadvantage of such external correction is that the system becomes bulkier, more complex and costly.

C. The Invention in Brief

1. Structure of the Invention

Figure 2:
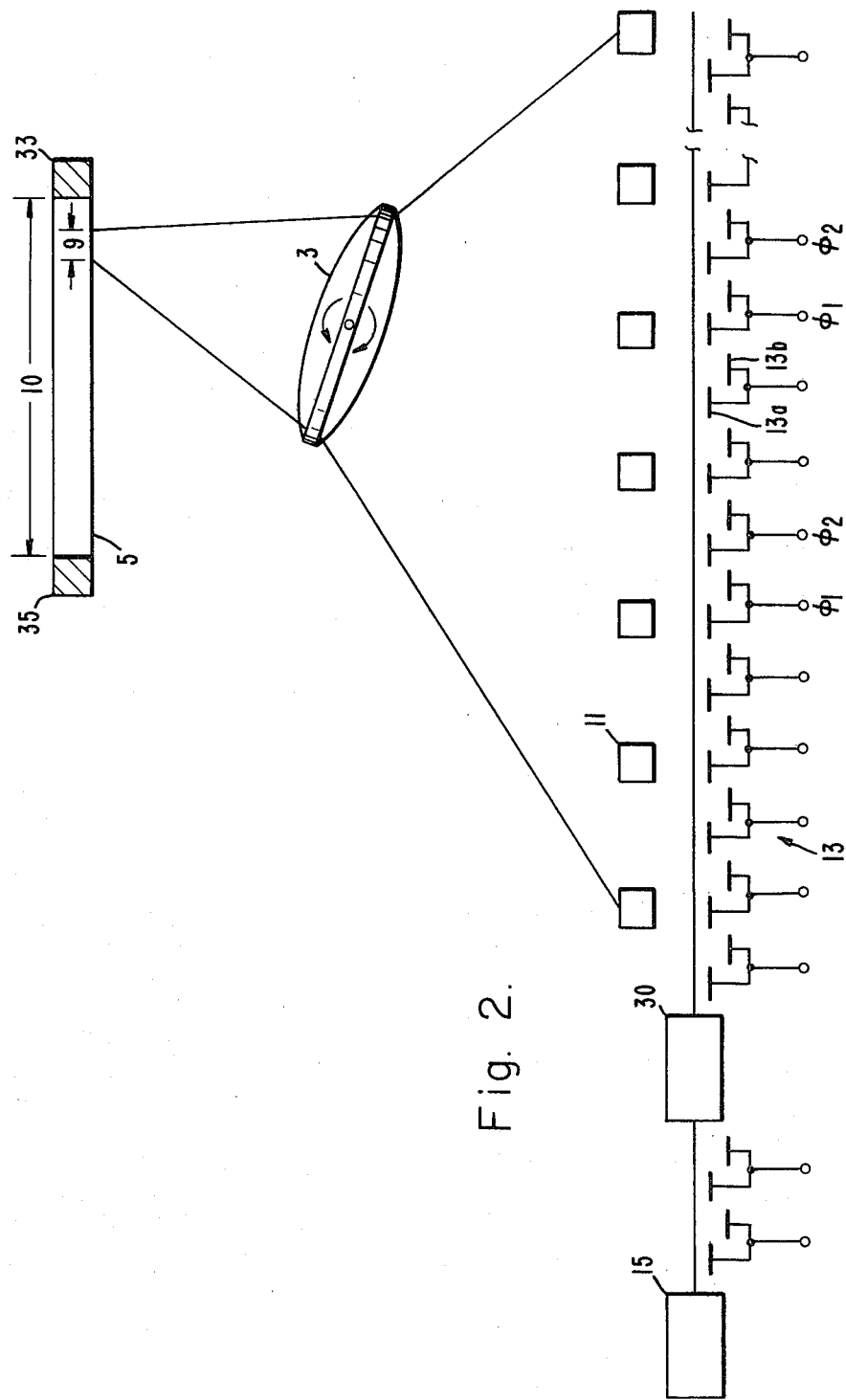
FIG. 2 is a simplified schematic representation of a single column of photodetectors in the focal plane array of FIG. 1.
Figure 3C:
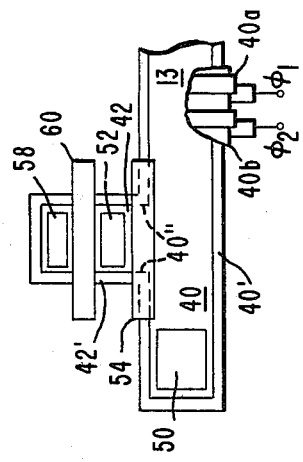
FIG. 3c is a plan view of the main CCD channel and retrace CCD channel of the ARC circuit corresponding to FIGS. 3a and 3b.
Figure 3A:
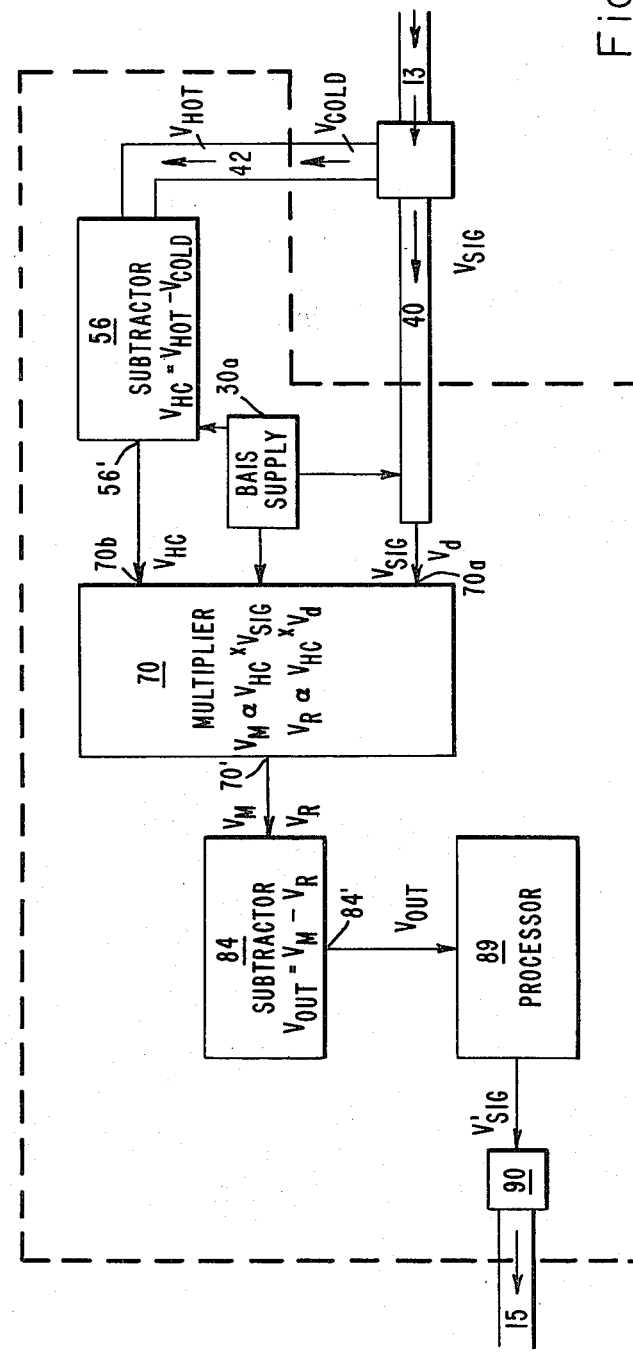
FIG. 3a is a simplified block diagram of the ARC circuit of the present invention.

In the present invention, an automatic responsivity control (ARC) circuit 30, illustrated in simplified block diagram form in FIG. 3a, compensates for non-uniform responsivity deviations and is a charge coupled device which is integrated into the focal plane on the surface of the substrate 1. Referring to FIGS. 1 and 2, the ARC circuit 30 is disposed between the output of a single column readout register 13 and a parallel input to the horizontal multiplexing register 15. Referring to FIG. 3a, the ARC circuit 30 includes a main channel 40 which receives charge packets from the output register 13, a retrace channel 42 into which charge packets are diverted from the main channel 40 during the retrace movement of the optics 3, a multiplier 70 having an input 70a connected to the output of the main channel 40, a subtractor 56 having its input connected to the output of the retrace channel 42 and its output 56' connected to another multiplier input 70b. Another subtractor 84 is connected between multiplier output 70' and a processor 89. The processor 89 controls the output of charge packets into the multiplexing register 15 from a CCD charge injector 90 in response to the output from the subtractor 84. A bias voltage source 30a provides requisite bias voltages to each of the components 56, 70, 84 of the ARC circuit 30.

2. Theory of Operation of the Invention

The average reponsivity R of a given column of photodetectors 11 may be characterized as a uniform responsivity $R_O$ (which is the same for all columns) plus a non-unform deviation $\Delta R$ (which may differ uncontrollably between columns). The purpose of the ARC circuit 30 is to substantially reduce the effect of the non-uniform responsivity deviation $\Delta R$ on the output of the CCD injector 90.

The operation of the ARC circuit 30 is illustrated in the block diagram of FIG. 3a. Hot and cold reference charge packets, $V_{hot}$ and $V_{cold}$, are generated when the image element 9 is traced across the hot and cold surfaces 33,35 respectively during the retrace movement of the optics 3. The $V_{hot}$ and $V_{cold}$ charge packets are transferred from the column register 13 into the main channel 40 and are immediately diverted into the separate retrace channel 42 and subtracted from one another in the subtractor 56 to create a difference reference voltage $V_{hc}$ at the subtractor output 56'. The reference voltage $V_{hc}$ is independent of any DC bias in the photodetectors 11 or the CCD column register 13 by virtue of the subtraction performed. The reference voltage $V_{hc}$ thus established during the retrace movement of the optics 3 is then maintained at the subtractor output 56' throughout the subsequent scanning movement of the optics 3.

During the subsequent scanning movement of the optical device 3 in which the narrow image element 9 is moved vertically downward in the field of view 10 between the hot and cold surfaces 35,33, an image signal charge packet, $V_{sig}$, is clocked upwardly in the CCD column register 13 as the charge output from each photodetector 11 successively adjacent the charge packet $V_{sig}$ is integrated in the manner of time delay and integration as previously described. When the $V_{sig}$ charge packet reaches the top end of the column register 13, it is clocked into the main channel 40 in the ARC circuit 30 where it is sensed as an image signal $V_{sig}$. The image signal $V_{sig}$ is applied as a voltage to the multiplier input 70a. Meanwhile, the difference signal $V_{hc}$ at the subtractor output 56' is applied to the other multiplier input 70b so that the multiplier 70 operates to produce an output product signal $V_m$ at its output 70', where:

$$V_m = V_{hc} \times V_{sig}.$$

The magnitudes of the signals $V_{sig}$ and $V_{hc}$ are each determined by the average responsivity $R = R_O + \Delta R$ of the corresponding column of photodetectors 11 adjacent the vertical column register 13. Therefore, the resulting product signal $V_m$ is a function of $(R_O+\Delta R)^2$ and thus contains the desirable terms in $R_O$ and $R_O^2$ and also contains undesirable terms in $\Delta R$ and $\Delta R^2$. The non-uniform responsivity deviation $\Delta R$ is typically much smaller than $R_O$ so that the term $\Delta R^2$ is not a significant source of distortion and may be ignored. Therefore, the only remaining task of the ARC circuit 30 is to eliminate the terms in $\Delta R$ to provide the desired correction. This is accomplished by forming a third reference signal $V_r$ (which is itself a function of $(R_O+\Delta R)^2$) which is then subtracted in the second subtractor 84 from the product signal $V_m$ to produce an output signal $V_{out} = V_m - V_r$. It is a discovery of this invention that, by adjusting the reference signals $V_{hc}$, $V_r$ in accordance with a particular selection of the bias voltages supplied to the ARC circuit 30 from the bias voltage supply 30a, the second subtraction $V_m - V_r$ results in a cancellation of all terms in $\Delta R$, thus achieving the desired result. This selection will be discussed below.

II. Detailed Description of the System With The Invention

A. Optical Scanning Signal Generation

Figure 3B:
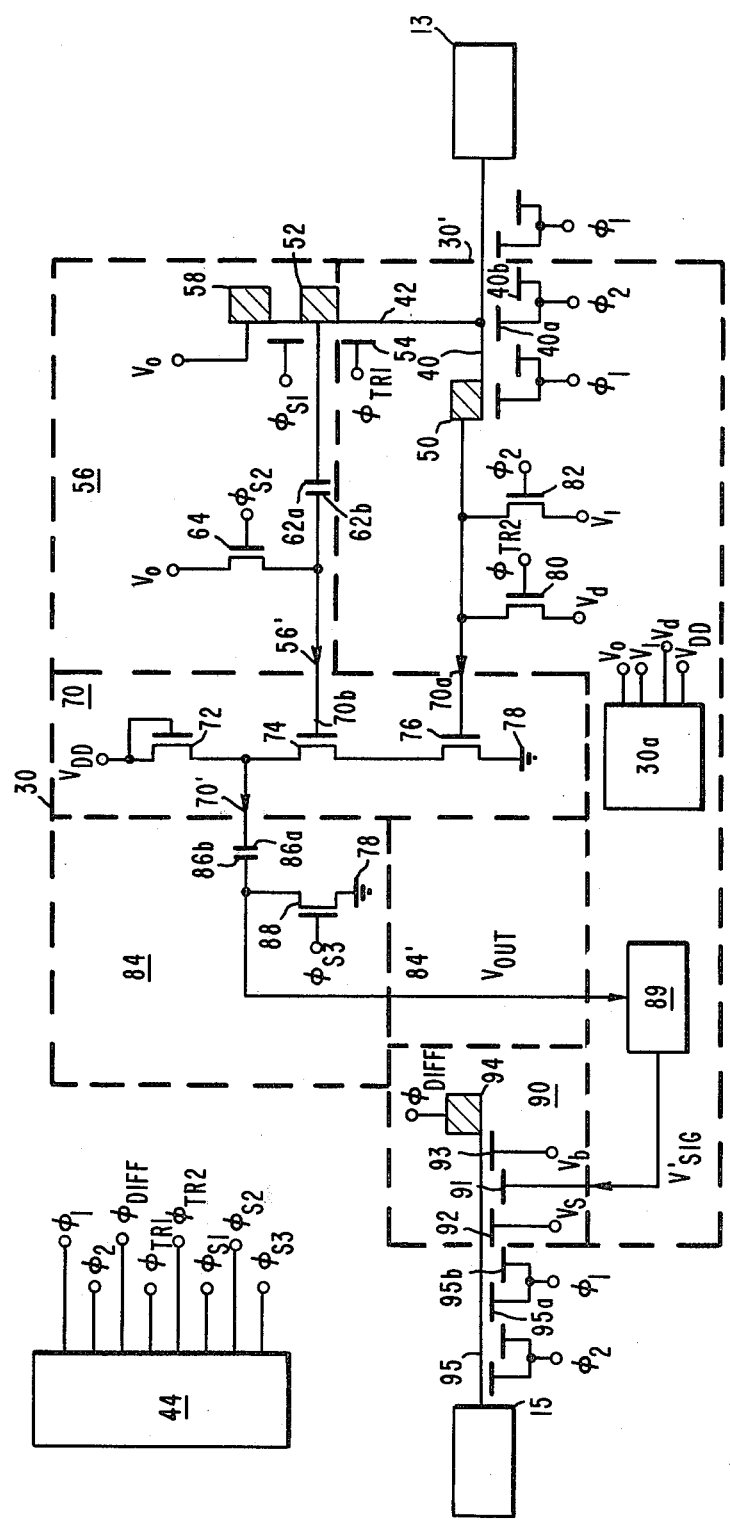
FIG. 3b is a schematic diagram of the ARC circuit of the present invention.

Referring to FIG. 2 and to the schematic diagram of FIG. 3b, the ARC circuit 30 receives charge packets from the register 13 and outputs charge packets into the multiplexing register 15. FIG. 2 shows a typical column register 13 which includes a plurality of upper and lower level electrodes 13a, 13b disposed over the top surface of the semiconductive substrate 1 and insulated therefrom by an insulating oxide layer (not shown). Each of the column registers 13 is a charge coupled device serial register of the type well-known in the art and discussed in the Sequin publication referenced above. Each vertical column of photodetectors 11 adjacent a corresponding vertical column register 13 receives light rays passsing through a corresponding portion of the image element 9 focused onto the focal plane of detectors 11 by the optical device 3. The image element 9 is scanned vertically downward in the field of view 10 by movement of the optical device 3, so that images of stationary objects focused on a vertical column of photodetectors 11 move vertically upward in the column in synchronism with charge transfer in the corresponding column register 13 to achieve the time delay and integration of images discussed previously.

Accordingly, the servo mechanism 17 and the processor 19 controlling movement of the optical device 3 must be synchronized with charge transfer in the column register 13. For this purpose, each of the pairs of upper and lower level electrodes 13a, 13b are connected together, alternate pairs receiving a clock signal $\phi_1$ and remaining pairs receiving a complementary clock signal $\phi_2$ from a clock generator 44 shown in FIG. 3b, the clock signal $\phi_1$ being applied to the processor 19 controlling movement of the optical system 3 to provide the requisite synchronization.

The scanning and retrace movement of the optical system 3 under control to processor 19 is plotted in FIG. 4a, showing that the optical device 3 places the image element 9 at the top 35a of the cold reference surface 35 at time $T_0$ and causes the image element 9 to begin scanning vertically downward, which is indicated in FIG. 4a as a decrease in the height of the image element 9 from the top 35a of the cold surface 35. At time $T_a$ the image element 9 is located at the bottom 35b of the cold surface 35 so that the image element 9 commences traversing the field of view 10 defined between the hot and cold surfaces 33,35. At time $T_b$ the image element 9 is located at the top 33a of the hot surface 33 and at time $T_c$ the image element 9 reaches the bottom 33b of the hot surface 33, at which time the processor 19 causes the servo 17 to retrace the movement of the optical device 3 so that the image element 9 rapidly moves back to its original position at the top 35a of the cold surface 35. At time $T_d$ the image element 9 is again located at the top 35a of the cold surface 35 and the entire movement is repeated in a periodic manner.

FIG. 4b illustrates the power of the beam of incident photons on a particular one of the photodetectors 11 as a function of time in accordance with the plot of FIG. 4a, clearly showing the random image signal $H_{sig}$ received by the photo detector 11 from time $T_a$ to time $T_b$, the large reference signal $H_{hot}$ received while the image element 9 scans the hot surface 33 from time $T_b$ to time $T_c$, the rapid drop in signal from time $T_c$ to time $T_d$ when the image element 9 passes between the hot and cold surfaces 33, 35 and the small reference signal $H_{cold}$ received from time $T_d$ to time $T_e$ when the image element 9 scans the cold reference surface 35. The time period from time $T_b$ to time $T_e$ shall be called the "retrace" period.

Referring to FIGS. 5b and 5c, the time domain waveforms of the clock signals $\Phi_1$ and $\Phi_2$ are shown in an expanded time scale corresponding to the time window between times $T_p$ and $T_q$ of FIGS. 4a and 4b. The clock signal $\Phi_1$ is applied to the processor 19 to synchronize the movement of the optical device 3 with the transfer of charge in the column registers 13. The processor 19 may be of any type well known in the art which may count pulses from the clock signal $\Phi_1$ to increased the rotation of the servo mechanism 17 until a predetermined count is reached at time $T_c$, at which time the movement is retraced until the original position is reached at the $T_d$.

The charge clocked into the main channel 40 from the column register 13 is plotted as a function of time in the diagram of FIG. 5d using the same time scale as FIGS. 5b and 5c, clearly showing the transition between times $T_c$ and $T_d$ from the hot reference signal charge packets $V_{hot}$ (corresponding to the irradiance of the hot surface 33) to the cold reference signal charge packets $V_{cold}$ (corresponding to the irradiance $H_{cold}$ of the cold surface 35). FIG. 5d also shows the transition at time $T_e$ between the cold reference signal charge packets $V_{cold}$ and the image signal charge packets $V_{sig}$ (corresponding to the image irradiance $H_{sig}$).

B. Signal Processing

1. The Retrace Channel 42

FIG. 3c is a detailed plan view illustrating the structure of the main channel 40 and the retrace channel 42. The main channel 40 is defined by a channel stop 40' and an overlying plurality of insulated CCD clock electrodes 40a and 40b of the same type as the electrodes 13a, 13b of the column register 13. Charge transfer from right to left in the main channel 40 is effected by means of the clock signals $\Phi_1$ and $\Phi_2$ applied to alternate pairs of the upper and lower level electrodes 40a and 40b in the same manner as described above in connection with the CCD electrodes 13a, 13b. The main channel 40 is terminated in a floating diffusion 50 of a conductivity type opposite to that of the substrate 1. The retrace channel 42 is defined by a channel stop 42' and is located adjacent an opening 40" in the channel stop 40'. Charge transfer through the opening 40" is controlled by an overlying retrace electrode 54 connected to receive a clock signal $\Phi_{TR1}$.

During the scanning movement of the optical device 3 from time $T_a$ to time $T_b$ during which the image element 9 is located in the field of view 10 between the hot and cold surfaces 33, 35, the retrace electrodes 54 is held at a repulsive potential to prevent charge transfer through the opening 40" so that charge packets transferred from right to left in the main channel 40 enter the floating diffusion 50. However, during the retrace movement of the optical device 3 from time $T_b$ to time $T_e$ (during which the image element 9 is located first on the hot surface 33 and then on the cold surface 35), the retrace electrode 54 is set to an attractive potential to cause charge packets transferred from right to left in the main channel 40 to be diverted through the opening 40" into the retrace channel 52. At the end of the retrace period at time $T_e$, the retrace electrode 54 is again set to a repulsive potential to prevent charge transfer through the opening 40".

2. The Subtractor 56

The subtractor 56 illustrated in FIG. 3b processes charge packets stored in the retrace floating diffusion 52 and includes elements disposed in the retrance channel 42 which are best shown in the plan view of FIG. 3c, including a reset diffusion 58 adjacent the floating diffusion 52 and a reset electrode 60 overlying the substrate 1 between the two diffusions 52,58. The reset diffusion 58 is connected to a voltage source $V_0$. The subtractor 56 also includes elements external of the retrace channel 42 including a capacitor 62 and a reset transistor 64 shown in FIG. 3b. The floating diffusion 52 is connected to the right electrode 62a of the capacitor 62. The left capacitor electrode 62b is connected by the reset transistor 64 to a voltage source $V_0$. The transistor 64 is a metal oxide semiconductor field effect transistor (MOSFET) formed on the substrate 1. The output 56' of the subtractor 56 is the left capacitor plate 62b. Operation of the subtractor 56 is controlled by the clock signal $\phi_{TR1}$ (having a time domain waveform illustrated in FIG. 5e) applied to the retrace electrode 54, a clock signal $\phi_{S1}$ (having a time domain waveform illustrated in FIG. 5f) applied to the electrode 60 and a clock signal $\phi_{S2}$ (having a time domain waveform illustrated in FIG. 5g) applied to the gate of the MOSFET 64.

Figure 5:
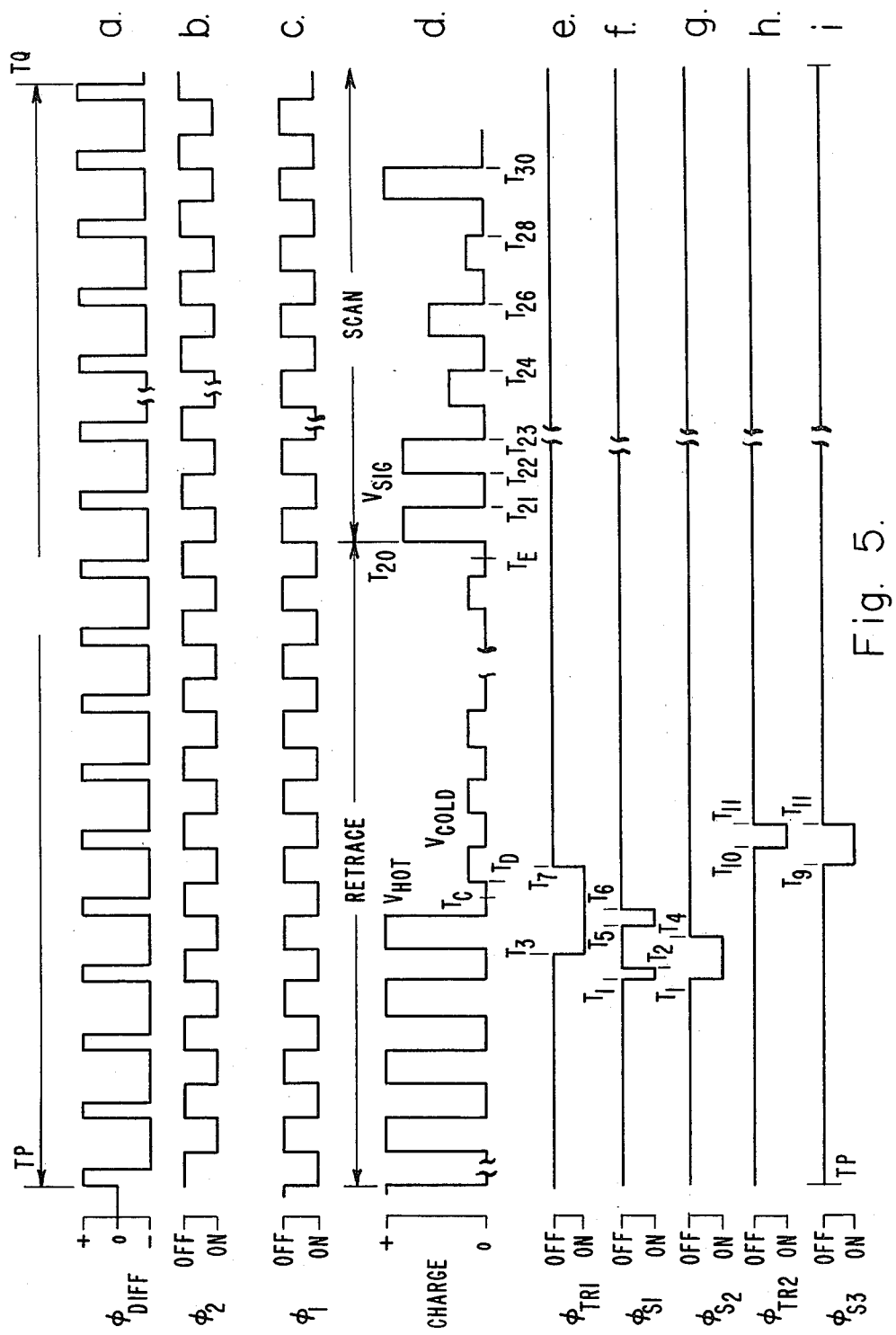

Operation of the subtractor 56 will now be described by simultaneous reference to FIG. 3b and FIG. 5. At time $t_1$ of FIG. 5, the clock signals $\phi_{S1}$ and $\phi_{S2}$ are on, causing both plates 62a, 62b of the capacitor 62 to be set to the potential of the voltage source $V_0$. At time $T_2$, the clock signal $\phi_{S1}$ is off, permitting the potential of the right capacitor plate 62a and of the diffusion 52 to float. Thereafter, at time $T_3$ the potential of the retrace electrode 54 is set to an attractive voltage by the clock signal $\phi_{TR1}$ in order to divert the next incoming charge packet $V_{hot}$ indicated in FIG. 5d into the retrace channel 42 through the opening 40''. Simultaneously, at time $T_3$ the charge packet $V_{hot}$ passes beneath the retrace electrode 54 and is stored in the floating diffusion 52, thus increasing the potential of the right capacitor plate 62 from $V_0$ to $V_0+V_{hot}$. The clock signal $\phi_{S2}$ is then turned off at time $T_4$ to allow the potential of the left capacitor plate 62b to float, after which, at time $T_5$, the clock signal $\phi_{S1}$ is again turned on to cause removal of the charge packet $V_{hot}$ from the floating diffusion 52 beneath the reset electrode 60 to the reset diffusion 58, thus creating an opposite displacement current at the left capacitor plates 62b. As a result, the left capacitor plate 62b is at a potential equal to $V_O-V_{hot}$ at time $T_5$. Thereafter, the potential of the right plate 62a is allowed to float when the clock signal $\phi_{S1}$ turns off at time $T_6$. At time $T_d$ the optical device 3 has retraced the narrow image element 9 vertically upward to the top 35a of the cold surface 35 so that the next incoming charge packet $V_{cold}$ indicated in FIG. 5 is of small magnitude. The clock signal $\phi_{TR1}$ is still on at time $T_d$, causing the charge packet $V_{cold}$ to be diverted beneath the retrace electrode 54 into the retrace channel 42 and stored in the retrace floating diffusion 52, creating a positive displacement current at the left capacitor plate 62b. As a result, at time $T_d$ the potential of the left capacitor plate is increased to $V_0-V_{hot}+V_{cold}$, which is the difference voltage $V_{hc}$ discussed previously. The clock signal $\phi_{TR1}$ is then turned off at time $T_7$ to prevent subsequent charge packets in the main channel 40 from passing through the opening 40'' and also to trap the $V_{cold}$ charge packet in the retrace diffusion 52 so that the difference voltage $V_{hc}$ is continuously maintained at the left capacitor 62b. Therefore, commencing at time $T_7$, the subtractor output 56' applies the difference voltage $V_{hc}$ to the multiplier input 70b and continues to do so during the subsequent optical scanning period from time $T_e$ to time $T_f$.

It should be noted that the difference voltage $V_{hc}$ maintained at the subtractor output 56' has a predetermined amplitude $V_0-V_{hot}+V_{cold}$ which is determined by the temperature of the hot surface 33, the temperature of the cold surface 35 and the voltage of the source $V_0$.

3. The Main Channel 40

Associated with the main channel 40 are two reset MOSFETS 80,82 which connect the floating diffusion 50 to two voltage sources $V_d, V_l$, respectively. The gate of the MOSFET 80 is controlled by the clock signal $\phi_{TR2'}$ illustrated in FIG. 5h, while the gate of the MOSFET 82 is controlled by the clock signal $\phi_2$. The diffusion 50 is connected to the multiplier input 70a, and the MOSFETS 80 and 82 function to periodically reset the voltage at the floating diffusion 50 to the voltages of the bias voltage sources $V_d$ and $V_l$ alternately.

During the scanning movement of the optical device 3 beginning at time $T_e$, the image element 9 is scanned downwardly in the field of view 10 so that an image charge packet $V_{sig}$ is generated in the column register 13 and enters the main channel 40 at time $T_{20}$ as indicated in FIG. 5d. Simultaneously, at time $T_{20}$ the clock signal $\phi_2$ applied to the gate of the MOSFET 82 is turned on and resets the potential of the floating diffusion 50 to the potential of the voltage source $V_1$. The image signal charge packet $V_{sig}$ is clocked into the floating diffusion 50 at time $T_{21}$ under control of the clocked electrodes 40a, 40b and is not diverted into the retrace channel 42 because the clock signal $\phi_{TR1}$ was turned off previously at time $T_7$, as discussed above. As a result, at time $T_{21}$ the potential of the floating diffusion 50 is increased from $V_0$ to $V_0+V_{sig}$ so that the increased voltage $V_0+V_{sig}$ is immediately applied to the multiplier input 70a. Therefore, at time $T_{21}$ a voltage proportional to $V_{sig}$ is applied to the multiplier input 70a while the difference voltage $V_{hc}$ is continuously applied to the other multiplier input 70b as discussed above.

4. The Multiplier 70

The multiplier 70 is a MOS multiplier which continuously produces a voltage $V_m$ at its output 70' which, as will be shown later in the specification, is proportional to the product of the voltage at its input 70a and the voltage at its input 70b. The multiplier 70 includes a first MOSFET 72 having its drain connected to a voltage source $V_{dd}$ and its source connected to the drain of a second MOSFET 74, the gate of the second MOSFET 74 comprising the multiplier input 70b. The source of the second MOSFET 74 is connected to the drain of a third MOSFET 76, the gate of the third MOSFET 76 comprising the multiplier input 70a, its source being connected to ground 78. The source of the MOSFET 72 comprises the multiplier output 70'. Although the multiplier circuit described herein is a MOS multiplier comprising three MOSFETs 72, 74 and 76 of a type known in the art, any suitable multiplier may be used in place of the multiplier 70 which has two inputs 70a, 70b and an output 70' wherein the multiplier produces a product voltage at its output 70' proportional to the voltage at its input 70a multiplied by the voltage at its input 70b. A derivation of the equations governing the operation of the MOS multiplier 70 will be made in an analysis set forth later in this application. An advantage of the MOS multiplier 70 is that it is easily integrated into the ARC circuit 30 on the focal plane substrate 1.

5. The Subtractor 84

The second subtractor 84 includes a capacitor 86 having its right plate 86a connected to the muliplier output 70' and its left plate 86b connected through the source and drain of a clocked reset MOSFET 88 to ground 78. The subtractor 84 operates to produce a difference voltage on its left plate 86b as follows:

During the preceding retrace period, the clock signal $\phi_{S3}$ is applied at time $T_9$ to the gate of the MOSFET 88 to set the left capacitor plate 86b to ground potential. While the left plate 86b is thus held to ground potential, the clock signal $\phi_{TR2}$ is applied to the gate of the MOSFET 80 at time $T_{10}$, setting the gate of the MOSFET 76 (the multiplier input 70a) to the potential of the voltage source $V_d$. Therefore, at time $T_{10}$ the multiplier 70 immediately produces an output voltage $V_r$ proportional to the product of the voltage $V_d$ at its input 70a multiplied by the difference voltage $V_{hc}$ continuously present at its other input 70b. Thus, at time $T_{10}$, the voltage at the multiplier output 70' is given as follows:

$$V_r \propto V_d \times V_{hc}.$$

(Since $V_d$ and $V_{hc}$ are both constant voltages, $V_r$ is also a constant reference level.) Consequently, the voltage on the right capacitor plate 86a is $V_r$ at time $T_{10}$ while the voltage on the left plate 86b is ground potential. Thereafter, both of the clock signals $\phi_{S3}$ and $\phi_{TR2}$ are turned off at time $T_{11}$ so that the potential of the left capacitor 86b is allowed to float.

As previously mentioned, at time $T_{20}$ the clock signal $\phi_2$ causes the transistor 82 to reset the potential of the floating diffusion 50 to the voltage source $V_l$ and at time $T_{21}$ the first image signal charge packet $V_{sig}$ enters the floating diffusion 50, thus increasing the voltage applied from the floating diffusion 50 to the multiplier input 70a from $V_l$ to $V_l+V_{sig}$. As a result, at time $T_{21}$ the output voltage at the multiplier 70' immediately reflects the change at its input 70a, and the new voltage $V_m$ at the multiplier output 70' reflects the product of its two inputs 70a,70b as follows:

$$V_m \propto V_{hc} \times V_{sig}.$$

The change in voltage at the multiplier output 70' at time $T_{21}$ from $V_r$ to $V_m$ creates an opposite displacement current at the left capacitor plate 86b so that the output voltage at the left capacitor 86b is equal to the change in voltage on the right capacitor plate 86a, namely, $V_r-V_m$. The output voltage $V_{out}$ at the subtractor output 84' at time $t_{21}$ is thus given as follows:

$$V_{out}=V_r-V_m.$$

It is a discovery of this invention that the desired cancellation of the terms in $\Delta R$ in the output voltage $V_{out}=V_r-V_m$ may be achieved if the bias voltage $V_1$ is selected to equal the bias voltage $V_d$ and if the bias voltage $V_0$ is selected to equal $-2Z_tR_0H_{hc}$ where the term $Z_t$ is the transimpedance of the charge coupled device comprising the serial register 13 and its associated photodetectors 11, the term $R_0$ is the uniform nominal responsivity of the photodetectors 11 discussed above and the term $H_{hc}$ corresponds to the difference voltage $V_{hc}$ and is the difference in the power of the photon beams incident on the photodetectors 11 when the image element 9 is traced across the hot surface 33 and when it is traced across the cold surface 35, respectively.

Thus, it is seen that at time $T_{21}$, when the first image signal charge packet $V_{sig}$ enters the floating diffusion 52 in the main channel 40, an output voltage $V_{out}$ is produced at the subtractor output 84 which is representative of a signal in which the distortion due to the responsivity deviation $\Delta R$ is substantially eliminated.

Subsequently, at time $T_{22}$ the clock signal $\phi_2$ causes the potential of the floating diffusion 50 to be reset to the bias voltage source $V_l$ while, simultaneously a second image signal charge packet indicated in FIG. 5d is transferred into the main channel 40. At time $t_{23}$ the second image signal charge packet is clocked into the floating diffusion 50 to produce a second output $V_{out}$ at the subtractor output 84'. The process is repeated in synchronism with the clock signals $\phi_1$ and $\phi_2$ so that the output voltage $V_{out}$ at the subtractor output 84' follows the magnitude of subsequent image signal charge packets transferred at times $T_{24}$, $T_{26}$, $T_{28}$, $T_{30}$ in the main channel as illustrated in FIG. 5d.

6. The Processor 89

The processor 89 reads the output voltage $V_{out}$ at the subtractor output 84' at times $T_{21}$, $T_{23}$, $T_{24}$, $T_{26}$, $T_{28}$ and $T_{30}$ and simultaneously applies a proportionate voltage to a CCD charge injector 90 to generate output charge packets loaded into a parallel input of the multiplexing register 15. The processor 89 scales the output voltage $V_{out}$ of the second subtractor 84 to generate a corrected image signal voltage $V'_{sig}$ applied to the CCD injector 90. In the analysis given below in this specification it will be shown that the processor preferably divides the voltage $V_{out}$ at the subtractor output 84' by a scaling factor $(V_0+V_tR_0H_{hc})$ to produce a corrected image signal voltage $V'_{sig}$, where $V'_{sig}=Z_tR_0H_{sig}$. Thus, the final image signal $V'_{sig}$ produced by the ARC circuit 30 and applied to the CCD charge injector 90 is the image photon beam power $H_{sig}$ multiplied by the uniform nominal responsivity $R_0$ and the CCD transimpedance $Z_t$, which is the desired result. The charge injector 90 may be any type of CCD charge injection device well known in the art, although the charge injection device 90 illustrated in FIG. 3b is a gate modulation input which is described in the above-referenced Sequin publication, and includes a control gate 91 connected to receive the voltage $V'_{sig}$ from th output of the processor 89, a screen electrode 92 connected to a bias voltage source $V_s$, a reference electrode 93 connected to a bias voltage source $V_b$ and an input diffusion 94 of a conductivity type opposite to that of the substrate 1 which is connected to receive the clock signal $\Phi_{diff}$ (having a time domain waveform illustrated in FIG. 5a), and an output channel 95 including upper and lower level electrodes 95a, 95b connected to receive the clock signals $\Phi_1$ and $\Phi_2$ in alternate pairs. The charge injector 90 generates charge packets transferred from right to left in the output channel 95 in synchronism with the clock signals $\phi_1$, $\phi_2$ (using principles well-known in the art).

From the foregoing description it should be apparent to those skilled in the art that each time an image signal charge packet ($V_{sig}$) is clocked into the floating diffusion 50 in the main channel 40, for example, at time $T_{20}$, a corresponding output charge packet is almost immediately injected from the CCD injector 90, in this example at time $T_{21}$, this output charge packet being proportional to the output voltage $V_{out}$ at the subtractor output 84' (and scaled by the processor 89) in which the distortion due to the non-uniform responsivity deviation $\Delta R$ has been substantially removed.

C. Analysis of the Signal Processing

The foregoing selection of the bias voltages $V_0$, $V_l$, $V_d$ and selection of the scale factor $(V_{00}+Z_tR_0 H_{hc})$ utilized by the processor 89 may be intuitively understood through the following simplified analysis:

As discussed previously, the current produced during optical scanning by the $i^{th}$ vertical column of photodetectors 11 may be characterized as the product of the average responsivity $R_i$ of that column of photodetectors multiplied by the power of irradiance $H_{sig}$ of the incident beam of photons. Defining the current generated by the photodetectors as I, the following equation obtains:

$$I=R_iH_{sig}.$$

As discussed previously, $R_i$ may be expressed as follows:

$$R_i=R_{00}+\Delta R_i$$

The corresponding potential $V_{sig}$ of the floating diffusion 50 produced by the photodetector current I is the product of the current I and the trans-impedance $Z_t$ of the charge coupled device comprising the $i^{th}$ column of photodetectors 11 and its corresponding column register 13. From this product, a term $v_1$ must be subtracted, corresponding to the potential of the voltage source $V_1$ to which the diffusion 50 is periodically reset. Summarizing the foregoing, during the scanning period from the $T_e$ to time $T_f$ of FIGS. 4 and 5, the voltage $V_{sig}$ applied to the multiplier input 70a from the main channel floating diffusion 50 is given by:

$$V_{sig} = V_1 - Z_t(R_{0O} + \Delta R_i)H_{sig}. \quad (1)$$

Figure 4:
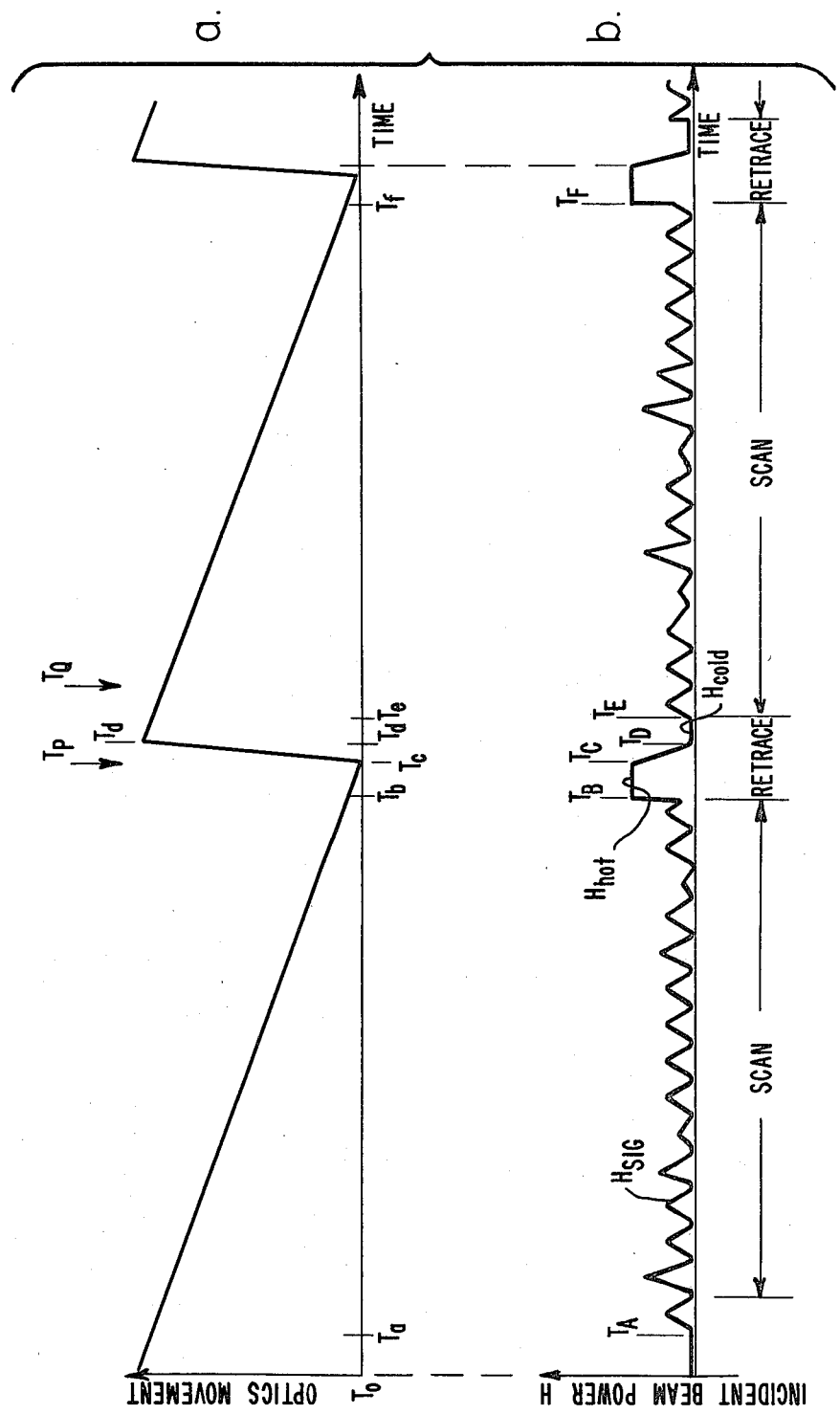

The subtractor 56 subtracts two voltages $V_{hot} = Z_t(R_0 + \Delta R_i)H_{hot}$ and $V_{cold} = Z_t(R_0 + \Delta R_i)H_{cold}$ generated in the retrace floating diffusion 52 during the retrace period from time $T_c$ to time $T_d$ of FIG. 4, when the optical device 3 views the irradiance $H_{hot}$ and $H_{cold}$ of the hot and cold reference 33 and 35 respectively.

Because the retrace diffusion 52 is periodically reset to the voltage source $V_o$, it may be shown that the reference voltage $V_{hc}$ applied to the multiplier input 70b from the subtractor output 56' is given by:

$$V_{hc} = V_{0O} + Z_t(R_{0O} + \Delta R_i)H_{hc}, \text{ where} \quad (2)$$

$$H_{hc} = H_{hot} - H_{cold}.$$

It should be recognized that the desired undistorted image signal voltage $V'_{sig}$ is the product of the transimpedance $Z_t$, the irradiance of the image $H_{sig}$ and the uniform responsivity $R_O$, exclusively, or:

$$V'_{sig} = Z_t R_O H_{sig}.$$

The purpose of the ARC circuit 30 is to transform the received signal voltage $V_{sig}$ into the undistorted signal voltage $V'_{sig}$, which is accomplished in accordance with the derivation given below.

The source-to-drain current $I_{ds}$ of the MOSFET 76 may be expressed as a function of the source-to-drain voltage $V_{ds}$, the gate-to-source voltage $V_{gs}$ and the threshold voltage $V_t$ of the MOSFET 76 according to a general formula given in Penney et al, *MOS Integrated Circuits*, Van Nostrand, Reinhold, New York (1972), p. 69:

$$I_{ds} = \beta[V_{ds}(V_{gs} - V_t) - V^2_{ds}/2], \quad (3)$$

where $\beta$ is the product of the minority carrier mobility, the oxide capacitance and the channel width divided by the channel length of the MOSFET 76. FIG. 3a shows that the gate-to-source voltage $V_{gs}$ is equal to the voltage $V_{sig}$ applied to the gate of the MOSFET 76.

In the preferred embodiment of the invention, the bias voltage $V_{dd}$ applied to the MOSFET 72 in the multiplier 70 is of sufficient magnitude to maintain the MOSFET 74 in saturated condition. As discussed at p. 66 in the above-referenced Penney publication, the drain voltage of saturated MOSFET 74 is approximately given by the difference between the voltage $V_{hc}$ applied to its gate and its threshold voltage $V_t$, which difference shall be termed $V'_{hc}$ where $V'_{hc} = V_{hc} - V_t$. It should be recognized that the drain voltage $V'_{hc}$ of the MOSFET 74 is also the source-to-drain voltage $V_{ds}$ of the MOSFET 76. Therefore, $$V_{ds} = V'_{hc}. \quad (3a)$$

Also, as discussed above, $$V_{gs} = V_{sig}. \quad (3b)$$

FIG. 3 shows that the drain and gate of the MOSFET 72 are connected together, which causes the MOSFET 72 to have a constant source-to-drain resistance $R_1$. Hence, the voltage $V_m$ at the output 70' of the multiplier 70 is equal to the difference between the bias voltage $V_{dd}$ and the product of the resistance $R_1$ and the source-to-drain current $I_{ds}$, which may be expressed as $$V_m = V_{dd} - R_1 I_{ds}. \quad (4)$$

Substituting equations 3a, 3b and 4 into equation 3:

$$V_m = V_{dd} - R_1\beta[V'_{hc}(V_{sig} - V_t) - V'^2_{hc}/2] \quad (5)$$

Equation 5 defines the output voltage $V_m$ of the multiplier 70 during the scanning period from time $T_e$ to $T_f$ of FIG. 4. However, during a portion of the retrace period between times $T_d$ and $T_e$, the clock signal $\Phi_{TR2}$ applied to the MOSFET 80 causes the gate of the MOSFET 76 to be set to the potential of the voltage source $V_d$. The resulting voltage $V_r$ at the output 70' of the multiplier 70 between times $T_d$ and $T_e$ may be obtained from equation 5 by substituting the potential of the voltage source $V_d$ for the signal voltage $V_{sig}$ to obtain the following equation:

$$V_r = V_{dd} - R_1\beta[V'_{hc}(V_d - V_t) - V'^2_{hc}/2]. \quad (6)$$

Equation 6 expresses the voltage $V_r$ of the multiplier output 70' during the short period between times $T_d$ and $T_e$ in which the gate of the MOSFET 76 is set to the potential of the voltage source $V_d$.

It will be remembered that the subtractor 84 operates to compute the difference between the two voltages $V_m$ and $V_r$ occurring during the time windows between times $T_e$ and $T_f$ and between times $T_d$ and $T_e$, respectively, to obtain a subtractor output voltage, $V_{out} = V_m - V_r$. The voltage $V_{out}$ may be computed by substituting equations 1 and 2 into equations 6 and 5 respectively and then subtracting equations 6 and 5 from one another, resulting in a complex expression including terms in $\Delta R_i$ and $\Delta R_i^2$. As discussed previously, if $\Delta R_i$ is sufficiently smaller than $R_O$, the term $\Delta R_i^2$ is a negligible source of error. However, the term $\Delta R_i$ remains a significant source of error. The term in $\Delta R_i$ may be eliminated in the complex expression obtained in the foregoing subtraction by selecting the bias voltages $V_O$, $V_I$ and $V_d$ to satisfy the following equality:

$$V_O H_{sig} = (V_d - V_t)H_{hc} = -2Z_t R_O H_{hc} H_{sig}. \quad (7)$$

Preferably, the following selection of bias voltages is made:

$$V_I = V_d \text{ and } V_O = -2Z_t R_O H_{hc}.$$

If this selection of bias voltages is made, the above-mentioned subtraction of equations 5 and 6 yields the following expression:

$$V_{out} = -(V_0 + Z_t R_0 H'_{hc}) Z_t R_0 H_{sig} \\ -(Z_t^2 \Delta R_i^2 H'_{hc} H_{sig}). \quad (8)$$

Equation 8 shows that the output voltage $V_{out}$ generated by the subtractor 84 contains only small distortions (or responsivity deviations) due to the negligible error source $\Delta R_i^2$, and contains no terms in $\Delta R_i$. The last term in equation 8, namely, $(z_t^2 \Delta R_i^2 H'_{hc} H_{sig})$, may be disregarded because the term $\Delta R_i^2$ is a small number in comparison with $R_o$ and $R_o^2$, so that the output voltage of the subtractor 84 may be approximately expressed as:

$$V_{out} \approx -(V_O + 2Z_t R_O H'_{hc})Z_t R_O H_{sig}, \quad (9)$$

which demonstrates that the distortion due to terms in $\Delta R$ have been effectively removed. Equation 9 shows that the desired undistorted image signal $V'_{sig}$, may be obtained by scaling the output voltage $V_{out}$ by the factor $-(V_O+Z_tR_OH'_{hc})^{-1}$. This scaling is performed by the processor 89, as indicated in FIG. 3c, thus:

$$V'_{sig}=Z_tR_OH_{sig}=V_{out}/(-V_O-Z_tR_OH'_{hc}).$$

The new signal voltage $V'_{sig}$ generated by the processor 89 is applied to the charge injection structure 90 to generate a serial train of charge packets representative of an output video signal $V'_{sig}$ which is substantially free of contributions due to the nonuniform responsivity deviation $\Delta R_i$.

It should be recognized by those skilled in the art that other variations of the ARC circuit 30, not discussed in this specification, are possible, which do not depart from the true scope of the invention. For example, the location of the hot and cold reference surfaces 33 and 35, respectively, relative to the field of view 10 may be rearranged, or the motion of the optical device 3 may be varied so as to generate the various signals $V_{hot}$, $V_{cold}$ and thus $V_{sig}$ in a sequence different from the one illustrated in FIG. 5d. Also, while a two-phase CCD clocking scheme is shown in the drawings as controlling charge transfer using the clock signals $\Phi_1$ and $\Phi_2$, a different clocking scheme may be employed, which may require a corresponding change in the time domain waveforms of the clock signals $\Phi_{S1}$, $\Phi_{S2}$, $\Phi_{S3}$, $\Phi_{TR1}$ and $\Phi_{TR2}$. Furthermore, while the charge sensing means in the main and retrace channels have been described as floating diffusions 50 and 52, respectively, it should be apparent that any suitable charge sensing device such as the various charge sensing devices in Sequin et al, Charge Transfer Devices, Academic Press, N.Y. (1975), pp. 52-58, including, for example, a resettable floating electrode, may be used. Similarly, while the charge injector 90 is shown as a CCD gate modulation device, any suitable charge input device, such as the various input devices discussed at pp. 48-52 in the above-referenced Sequin publication, may be utilized. Finally, other variations of the multiplying circuit 70 may be used while not departing from the true scope of the invention. It should also be noted that scaling of the output voltage $V_{out}$ at the subtractor output 84' may be accomplished by means other than the processor 89, and that the scaling factor discussed, $(V_OZ_tR_OH_{hc})$ may be discarded in favor of any other factor which is compatible with individual system requirements, inasmuch as the scaling performed by the processor 89 does not participate in the elimination of the $\Delta R$ signal terms.

What is claimed is:

1. In a charge coupled device (CCD) focal plane array of photodetectors formed on a semiconductive substrate which is optically scanned and retraced over a field of view to generate image signal charge packets during the optical scanning and to generate first and second reference level charge packets during the optical retracing, a circuit for automatically compensating for deviations in optical responsivity among the photodetectors, comprising:
   a CCD main channel disposed in said substrate so as to receive said image charge packets and said first and second reference level charge packets;
   a CCD retrace channel in said substrate;
   a clocked retrace electrode positioned so as to divert said reference level charge packets from said main channel into said retrace channel;
   charge coupled floating sensor means in said main channel periodically reset to a first voltage $V_1$ for generating an image signal voltage $V_{SIG}$ in response to each of said image signal charge packets;
   charge coupled floating sensor means in said retrace channel for generating reference voltages $V_{HOT}$ and $V_{COLD}$ in response to said first and second reference level charge packets, respectively, during said optical retracing;
   means for subtracting said reference voltages $V_{HOT}$ and $V_{COLD}$ from one another during said optical retracing to establish an output voltage $V_{HC}$ superimposed on a reference voltage $V_O$;
   a multiplier having two inputs and an output, one of said inputs connected to receive said first substractor output voltage $V_{HC}$, the other of said inputs connected to said main channel charge sensor so as to generate a voltage $V_M$ at said multiplier output which is proportional to the product $V_{SIG} \times V_{HC}$;
   means for periodically holding said other multiplier output to a third voltage $V_d$ so as to generate a voltage $V_R$ at said multiplier output which is proportional to the product $V_d \times V_{HC}$;
   means for subtracting said multiplier output voltages $V_M$ and $V_R$ to generate a difference voltage $V_{OUT}$, wherein the voltages $V_O$, $V_1$, and $V_d$ are selected so as to minimize the contribution of said detector responsivity deviations to said output voltage $V_{OUT}$.

2. The device of claim 1 wherein said first voltage $V_1$ is equal to said third voltage $V_d$, and said second voltage $V_O$ is proportional to said reference voltage $V_{HC}$.

3. The device of claim 1 further comprising means for generating output signal charge packets including processor means for transforming said output voltage $V_{OUT}$ into a signal voltage $V'_{SIG}$, and a CCD charge injector having a control electrode connected to receive said signal voltage $V'_{SIG}$.

4. The device of claim 3 wherein said processor means introduces a scaling factor between said output voltage $V_{OUT}$ and said signal voltage $V'_{SIG}$, said scaling factor proportional to the voltage $V_{HC}$.

5. In a focal plane array comprising a plurality of photodetectors each generating a photocurrent which is proportional to the irradiance of radiation incident on the array multiplied by the sum of a nominal photodetector responsivity $R_O$ which is uniform among the photodetectors plus a photodetector responsivity deviation $\Delta R$ which is not uniform among the photodetectors, a method for producing an output signal which is free of distortion due to the responsivity deviation $\Delta R$, comprising:
   focusing onto said array a first reference beam of a first known irradiance to generate a first reference signal $V_H$;
   focusing onto said array a second reference beam of a second known irradiance to generate a second reference signal $V_C$;
   forming a difference voltage $V_{HC}=V_H-V_C$, superimposed on a bias voltage $V_O$;
   focusing onto said array an image to generate a signal voltage $V_{SIG}$ superimposed on a bias voltage $V_1$;
   generating a voltage $V_R$ which is proportional to the product of said difference voltage $V_{HC}$ multiplied by a bias voltage $V_d$;

generating a voltage $V_M$ which is proportional to the product $V_{SIG} \times V_{HC}$; and subtracting said voltages $V_M$ and $V_R$ to form a difference output $V_{OUT}$, wherein said bias voltages $V_O$, $V_I$ and $V_D$ are selected to substantially eliminate the coefficients of $\Delta R$ in $V_{OUT}$.

6. The method of claim 5 wherein said bias voltages are selected as follows:

$V_I = V_d$;
$V_O = Z_T R_O H_{HC}$, where $Z_T$ is the transimpedance of the charge transfer device and $H_{HC}$ is the difference in irradiance of the first and second reference beams.

7. The method of claim 5 further comprising the step of scanning said image across the field of view to generate a serial sequence of image signals $V_{SIG}$.

8. The method of claim 7 wherein said scanning is performed in synchronism with charge transfer in said charge transfer device.

9. The method of claim 7 wherein each succeeding image signal $V_{SIG}$ is utilized to generate a new product voltage $V_M$ so as to generate successive output voltages $V_{OUT}$ in synchronism with said charge transfer.

10. In a charge coupled device (CCD) focal plane array of photodetectors formed on a semiconductive substrate and optically scanned and retraced over a field of view to generate image signal charge packets during optical scanning and to generate HOT and COLD reference level charge packets during optical retracing, a circuit for automatically compensating for deviations in optical responsivity among photodetectors, comprising:

a CCD main channel and a CCD retrace channel on said substrate;

means including a clocked retrace electrode for diverting said reference level charge packets into said retrace channel;

charge sensing means in said main channel periodically reset to a first voltage $V_I$ for generating an image signal voltage $V_{SIG}$ in response to each of said image signal charge packets;

charge sensing means in said retrace channel for generating reference voltages $V_{HOT}$ and $V_{COLD}$ in response to said HOT and COLD reference level charge packets, respectively, during said optical retracing;

a first subtracting capacitor having two plates, one of said plates connected to said retrace channel sensor means to receive said reference voltages $V_{HOT}$ and $V_{COLD}$ during said optical retracing, the other of said plates having its potential set to a second voltage $V_O$ whenever said one plate receives one of said voltages $V_{HOT}$ and $V_{COLD}$, said other plate having its potential floating whenever said one plate receives the other of said voltages $V_{HOT}$ and $V_{COLD}$, so that said other plate is at a potential $V_{HOT} - V_{COLD} + V_O = V_{HC}$ during said optical scanning;

a multiplier having two inputs and an output, one of said inputs connected to receive said difference voltage $V_{HC}$, the other of said inputs connected to said main channel charge sensor means so as to generate a voltage $V_M$ proportional to the product $V_{SIG} \times V_{HC}$ at said multiplier output;

means for periodically holding said other multiplier input to a third voltage $V_d$ so as to generate a voltage $V_R$ proportional to the product $V_d \times V_{HC}$; and a second subtracting capacitor having two plates, one of said plates connected to said multiplier output, the other of said plates having its potential set to a fourth voltage $V_G$ whenever said multiplier input is held to said third voltage $V_D$ by said holding means, said other plate having its potential floating during said optical scanning so as to assume a potential $V_{OUT}$ proportional to $V_M - V_R$ during said optical scanning.

11. The device of claim 10 wherein said multiplier comprises first and second transistors formed in said substrate, each of said transistors having a source, a drain and a gate, the source of said first transistor connected in series combination to the drain of said second transistor, the gate of one of said transistors connected to said other capacitor plate of said first subtracting capacitor, the gate of the other of said transistors connected to said main channel charge sensing means, said multiplier further comprising a bias voltage source connected in series with said first and second transistors.

12. The device of claim 10 further comprising means for generating output signal charge packets comprising:

a processor having an input and an output, said input connected to receive said voltage $V_{OUT}$; and a CCD charge injector having a control electrode, said control electrode connected to the output of said processor, wherein said processor performs a scaling function by dividing the voltage $V_{OUT}$ by a number proportional to the voltage $V_{HC}$.

13. An imager comprising in combination a charge transfer device readout from a focal plane array of a plurality of photodetectors, said photodetectors having an average responsivity $R_O$ which is the same throughout the array, each photodetector having an individual responsivity deviation $\Delta R$ which varies among the photodetectors, said imager including an aperture through which an image source periodically illuminates said array to generate a signal charge packet in said charge transfer device readout and a reference source of radiation which periodically illuminates said photodetector array to generate a reference charge packet in said charge transfer device readout so that said first and second charge packets may be separately operated upon and then combined to generate a result signal in which the coefficients of $\Delta R$ are substantially eliminated, said imager further comprising in combination with the foregoing:

means including a first charge flow channel for receiving said first and second charge packets and including second and third channels and further including means for separating said first and second charge packets into said second and third channels respectively;

means including first and second inputs connected to said second and third channels for sensing first and second signal levels corresponding to said first and second charge packets and for processing said first and second signal levels to generate an output signal.

14. The imager of claim 13 wherein said first and second signal levels are each proportional to $(R_O + \Delta R)$ and wherein said output signal generating means includes:

means for multiplying said first and second signal levels to generate a first voltage $V_m$ which is proportional to $(R_O + \Delta R)^2$;

means for generating a predetermined voltage $V_r$ which is proportional to $(R_O + \Delta R)^2$; and means for performing the subtraction $V_m - V_r$ wherein the coefficients of $\Delta R$ are substantially eliminated.

* * * * *

UNITED STATES PATENT AND TRADEMARK OFFICE
CERTIFICATE OF CORRECTION

PATENT NO. : 4,345,148

DATED : August 17, 1982

INVENTOR(S) : Michael Y. Pines et al

It is certified that error appears in the above—identified patent and that said Letters Patent is hereby corrected as shown below:

Column 5, line 31, delete "reponsivity" and insert therefor --responsivity--.

Column 16, line 24, delete "output" and insert therefor --input--.

*Signed and Sealed this*

*Twenty-eighth* Day of *May 1985*

[SEAL]

*Attest:*

DONALD J. QUIGG

*Attesting Officer*     *Acting Commissioner of Patents and Trademarks*